United States Patent [19]

Dusa et al.

[11] Patent Number: 4,592,201
[45] Date of Patent: Jun. 3, 1986

[54] TURBOFAN MIXED FLOW EXHAUST SYSTEM

[75] Inventors: Donald J. Dusa, Cincinnati; Andrew P. Kuchar; Guy K. Faust, both of West Chester, all of Ohio

[73] Assignee: General Electric Company, Cincinnati, Ohio

[21] Appl. No.: 604,413

[22] Filed: Apr. 30, 1984

Related U.S. Application Data

[63] Continuation of Ser. No. 397,321, Jul. 12, 1982, abandoned.

[51] Int. Cl.⁴ ............................................. F02K 1/38
[52] U.S. Cl. .................................... 60/262; 239/265.19
[58] Field of Search ............. 60/262, 263, 271, 226.1; 181/213, 212, 215–217, 220, 224, 228, 239, 252, 256, 259, 264; 239/265.19, 265.37; 138/44, 173

[56] References Cited

U.S. PATENT DOCUMENTS

| | | | |
|---|---|---|---|
| 2,641,104 | 6/1953 | Estabrook | 239/265.19 |
| 3,514,955 | 6/1970 | Paulson et al. | 60/262 |
| 3,861,140 | 1/1975 | Krabacher | 60/262 |
| 3,927,522 | 12/1975 | Bryce et al. | 60/264 |
| 4,045,957 | 9/1977 | DiSabato | 60/262 |
| 4,066,214 | 1/1978 | Johnson | 239/265.19 |
| 4,147,029 | 4/1979 | Sargisson | 60/262 |
| 4,240,252 | 12/1980 | Sargisson et al. | 60/262 |

FOREIGN PATENT DOCUMENTS

| | | | |
|---|---|---|---|
| 34079 | 8/1981 | European Pat. Off. | 138/44 |
| 2720242 | 11/1977 | Fed. Rep. of Germany | 60/262 |
| 874496 | 8/1961 | United Kingdom . | |
| 1471417 | 4/1977 | United Kingdom . | |
| 2031070 | 4/1980 | United Kingdom . | |

*Primary Examiner*—Louis J. Casaregola
*Assistant Examiner*—Donald E. Stout
*Attorney, Agent, or Firm*—Douglas S. Foote; Francis L. Conte; Derek P. Lawrence

[57] ABSTRACT

An improved exhaust system including a lobed mixer and an improved exhaust centerbody is provided. The improved exhaust centerbody includes means for cooperating with the lobed mixer to increase mixing effectiveness of the exhaust system without substantially increasing pressure losses attributable thereto. In a preferred embodiment of the invention, the cooperating means include a plurality of circumferentially spaced elongated deformations, such as grooves and ridges, which deformations extend radially with respect to a reference surface of the exhaust centerbody and which deformations are aligned in an axial direction substantially parallel to a longitudinal axis of the centerbody.

8 Claims, 5 Drawing Figures

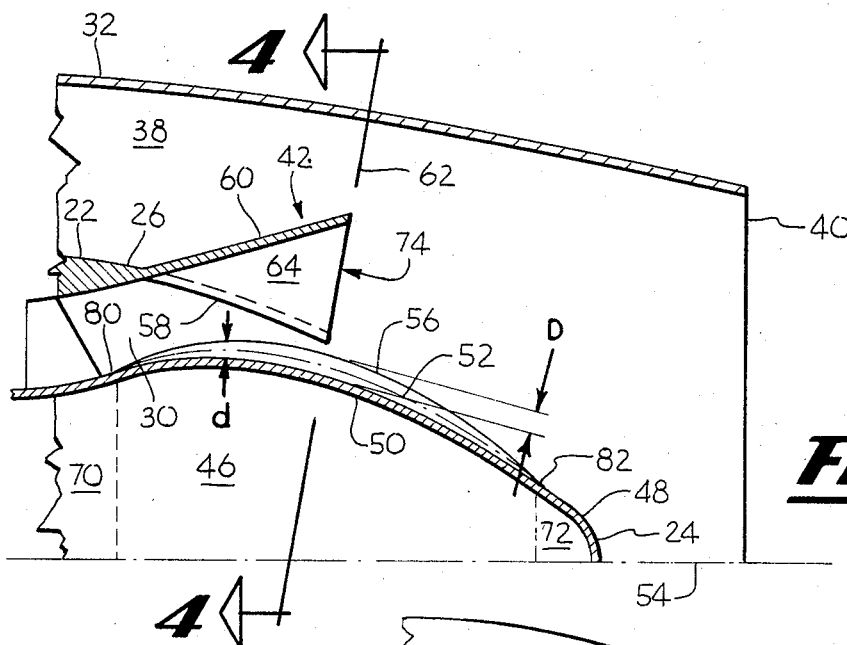
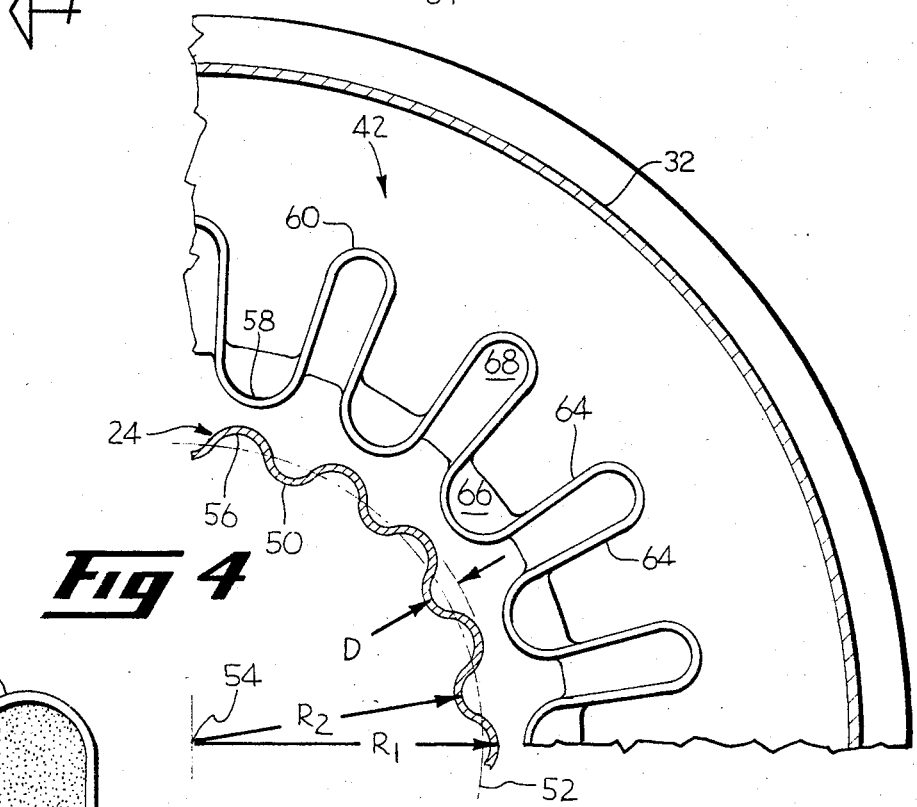
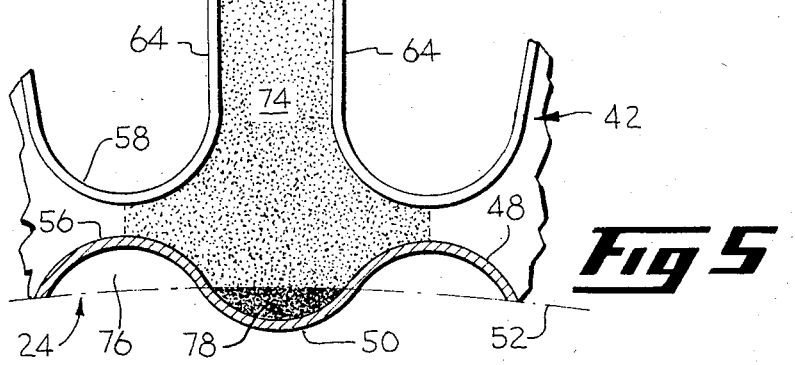

TURBOFAN MIXED FLOW EXHAUST SYSTEM

The invention herein described was made in the performance of work under a NASA contract and is subject to the provisions of Section 305 of the National Aeronautics and Space Act of 1958, Public Law 85-568 (72 Stat. 435; 42 USC 2457).

This is a continuation of application Ser. No. 397,321, filed July 12, 1982, now abandoned.

FIELD OF THE INVENTION

This invention relates to an exhaust system for a mixed flow gas turbine engine and, more particularly, to an improved exhaust centerbody and mixer assembly for internal mixing of fan bypass air and core engine exhaust gases.

BACKGROUND OF THE INVENTION

It is known in gas turbine engine technology that improvements in bypass turbofan engine performance can be obtained by efficiently mixing fan bypass air with core engine exhaust gases and discharging the combined flow through a single exhaust nozzle. One exhaust system for mixing the fan bypass air and exhaust gases includes a lobed mixer disposed downstream of the core engine. The lobed mixer forces the relatively hot exhaust gases to mix with the relatively cold fan bypass air for realizing improved thermodynamic performance and, thereby, improved specific fuel consumption.

Improved thermodynamic performance of the gas turbine engine occurs when the combined fan and core engine exhaust flow has a relatively uniform temperature substantially lower than the unmixed peak temperatures at the exhaust nozzle exit plane. Various exhaust system geometric parameters have been evaluated for increasing mixing effectiveness for obtaining more uniform temperature distributions. Some of the parameters evaluated include, for example, the number of lobes in the mixer, mixer height, mixer length, mixer cross sections, mixer and end view shapes, and mixer cutbacks. Additional geometric parameters evaluated include exhaust system tailpipe diameter, shape, and mixing length.

However, it has been determined that although mixing effectiveness can be increased by appropriately varying these geometric parameters, parasitic pressure losses associated with the exhaust system generally increase as well. For example, in a high bypass ratio turbofan engine, the exhaust dynamic pressure is generally a large proportion of the exhaust total pressure, and therefore the engine is subject to relatively large parasitic pressure losses. Accordingly, prior art exhaust systems typically represent compromise systems limited in mixing effectiveness by the parasitic pressure losses.

Accordingly, it is one object of this invention to provide an improved exhaust system for a mixed flow gas turbine engine.

Another object of this invention is to provide an improved exhaust system which provides increased internal mixing of core engine exhaust gases and fan bypass air to achieve a more uniform temperature distribution across the exhaust nozzle exit plane.

Another object of this inventiion is to provide an improved exhaust system having increased mixer effectiveness without significantly increasing pressure losses attributable thereto.

SUMMARY OF THE INVENTION

According to one form of the present invention, an improved exhaust system including a lobed mixer and an improved exhaust centerbody is provided. The improved exhaust centerbody includes means for cooperating with the lobed mixer to increase mixing effectiveness of the exhaust system without substantially increasing pressure losses attributable thereto. In a preferred embodiment of the invention, the means include a plurality of circumferentially spaced elongated deformations, such as grooves and ridges, which extend radially with respect to a reference surface of the exhaust centerbody and which are aligned in an axial direction substantially parallel to a longitudinal axis of the centerbody.

BRIEF DESCRIPTION OF THE DRAWING

The invention together with further objects and advantages thereof, is more particularly described in the following detailed description taken in conjuction with the accompanying drawing, in which:

FIG. 3 is a cross-sectional view illustrating in more detail the lobed mixer and exhaust centerbody of FIG. 2.

FIG. 4 is an end view of the mixer and exhaust centerbody of FIG. 3 taken along line 4—4.

FIG. 5 is an enlarged end view of a portion of the mixer and exhaust centerbody of FIG. 4 illustrating cross-sectional flow areas thereof.

DETAILED DESCRIPTION

Figure 1:
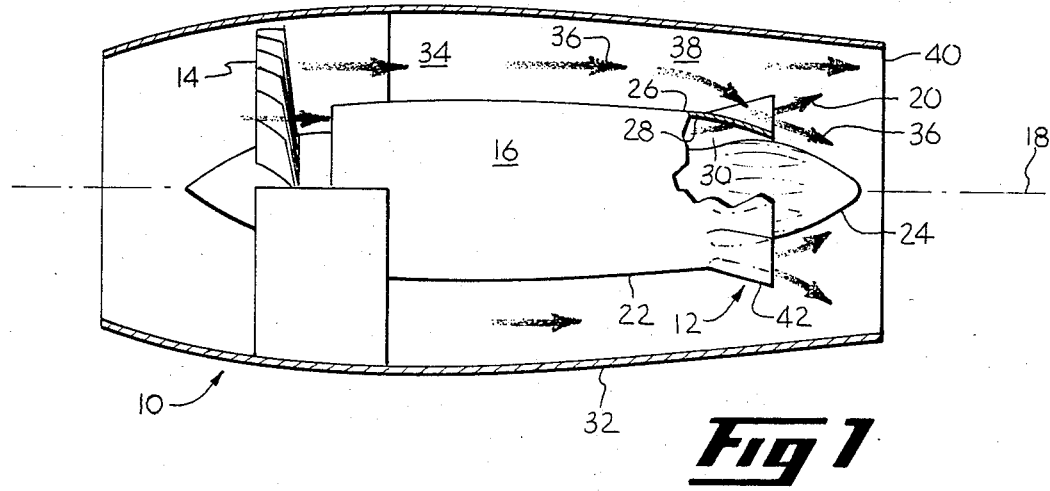
FIG. 1 is a cross-sectional view of an exemplary high bypass mixed flow gas turbine engine incorporating an exhaust system according to one form of the present invention.

Referring to FIG. 1, there is shown an exemplary high bypass mixed flow gas turbofan engine 10 including an exhaust system 12 according to one form of the present invention. The turbofan engine 10 includes a fan 14 driven by a core engine 16 disposed downstream from the fan 14 and coaxially about an engine longitudinal axis 18. The core engine 16 includes a compressor, combustor and turbine (all not shown) and is effective for discharging relatively hot combustion exhaust gases 20.

Disposed circumferentially about the core engine 16 is a core cowl 22. An aerodynamically streamlined exhaust centerbody 24 according to one form of the present invention, described hereinafter, is suitably attached to the core engine 16 and extends in a downstream direction from an annular aft end 26 of the core cowl 22. The exhaust centerbody 24 is spaced radially inwardly from an inner surface 28 of the core cowl 22 to define an annular core nozzle 30 for discharging the exhaust gases 20 from the core engine 16. Accordingly, the term "exhaust centerbody" as used herein refers to the structure which defines the radially inward flowpath for exhaust gases discharged from an engine.

Circumferentially disposed about the fan 14 and core engine 16 is a nacelle 32 which is spaced radially outwardly from the core cowl 22 to define an annular bypass duct 34 for channeling relatively cold fan bypass air 36 downstream from the fan 14. The nacelle 32 cooperates with the aft end 26 of the core cowl 22 to define an annular fan nozzle 38 for discharging the fan bypass air 36, or simply fan air 36, from the bypass duct 34. The nacelle 32 extends downstream from the aft end 26 of the core cowl 22 for also defining a single exhaust nozzle 40 for discharging both the fan air 36 from the fan nozzle 38 and the exhaust gases 20 from the core nozzle 30 in a combined, mixed flow.

Located within the exhaust nozzle 40, suitably attached to the aft end 26 of the core cowl 22, and spaced radially outwardly from the exhaust centerbody 24 is a lobed mixer 42. The mixer 42 is effective for mixing the fan air 36 from the fan nozzle 38 and the exhaust gases 20 from the core nozzle 30 prior to discharging the combined flow thereof through the exhaust nozzle 40. The combination of the mixer 42, exhaust centerbody 24, fan nozzle 38, core nozzle 30 and exhaust nozzle 40 comprise the exhaust system 12 of the engine 10.

Examples of typical lobed mixers are described in U.S. Pat. No. 4,240,252 granted to D. F. Sargisson and V. G. Harris and U.S. Pat. No. 3,861,140 granted to R. A. Krabacher, both incorporated herein by reference.

An example of a suitable mixed flow gas turbine engine including a lobed mixer is disclosed in U.S. Pat. No. 4,147,029 granted to D. F. Sargisson, also incorporated herein by reference.

Figure 2:
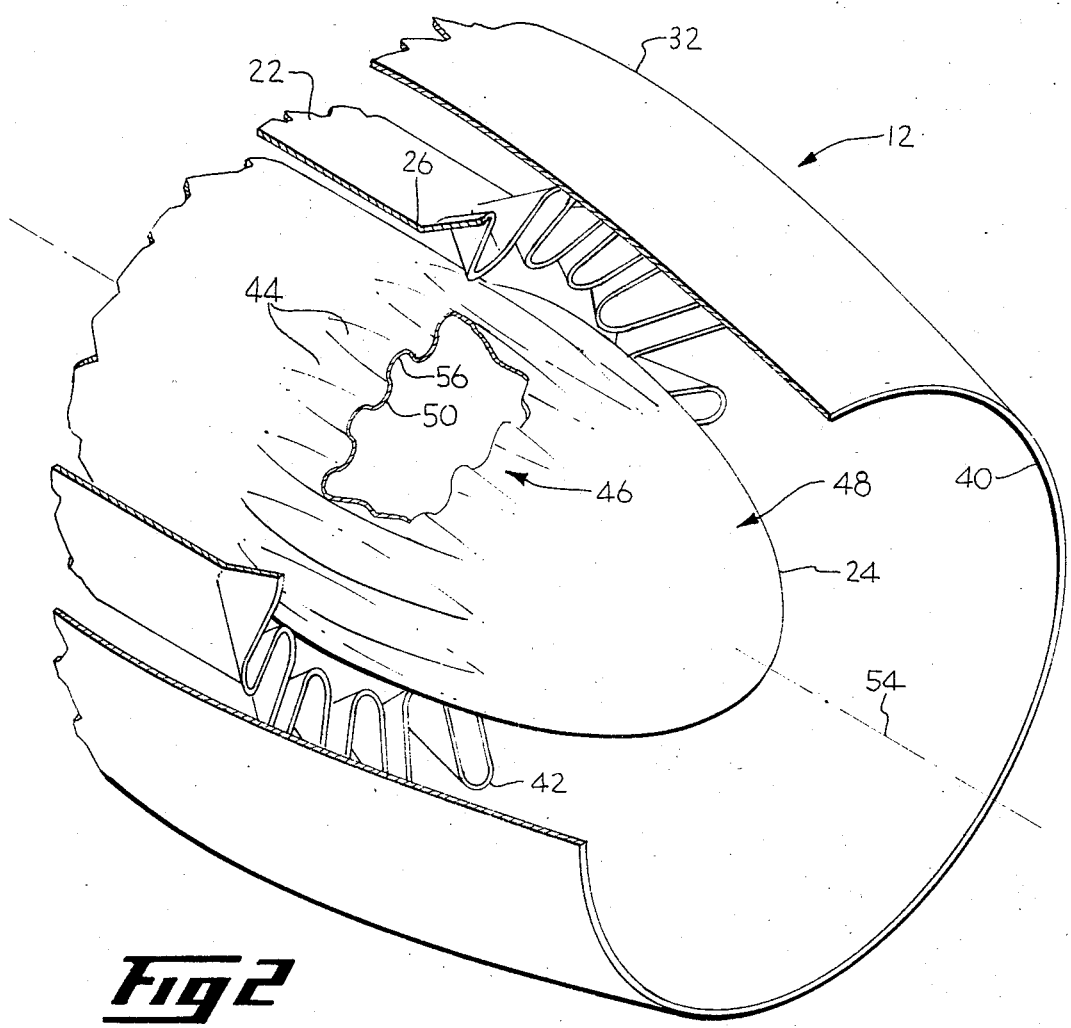
FIG. 2 is an isometric view, partly in section, illustrating the exhaust system of FIG. 1 including a lobed mixer and an improved exhaust centerbody.

According to one form of the present invention, an improved exhaust system 12 including a mixer 42 and an improved exhaust centerbody 24 is illustrated in more detail in FIG. 2. The improved exhaust centerbody 24 includes means 44 for cooperating with the lobed mixer 42 for increasing the mixing effectiveness of the exhaust system 12 without substantially increasing pressure losses therein.

In one embodiment, the means 44 include a plurality of circumferentially spaced deformations 44 disposed in an intermediate portion 46 of a radially outer surface 48 of the centerbody 24. More specifically, referring to FIGS. 2 and 3, the centerbody 24 is corrugated or shaped into spaced folds and includes a plurality of circumferentially spaced depressions or grooves 50 which extend radially inwardly with respect to a nominal, reference surface 52 of the intermediate portion 46 thereof. The reference surface 52 represents the outer surface of a typical prior art centerbody not having the deformations 44 therein. Each of the grooves 50 also extends substantially axially in the intermediate portion 46 and is aligned substantially parallel to a longitudinal axis 54 of the centerbody 24. When the centerbody 24 is in the engine 10, the longitudinal axis 54 thereof is aligned with the longitudinal axis 18 of the engine 10 as shown in FIG. 1.

The centerbody 24 also includes a plurality of ridges 56 which extend radially outwardly with respect to the nominal surface 52. Each of the ridges 56 also extends substantially axially in the intermediate portion 46 and is disposed parallel to and between adjacent grooves 50.

It should be clear from the foregoing description that the radially outer surface 48 of centerbody 24 is continuous and uninterrupted. Thus, the term "corrugated" as used herein refers to a geometric contour, containing alternating and generally parallel ridges and grooves, which is substantially continuous and contains no jump discontinuities in its slope. For example, an end cross sectional view of centerbody 24, such as shown in FIG. 4, reveals ridges 56 and grooves 50 in a generally sinusoidal curve. The term "deformation", as used herein, refers to a geometric contour which is substantially continuous and contains no jump discontinuities in its slope. For example, the term may be applied to a surface containing grooves and/or ridges.

Referring to FIGS. 3 and 4, the lobed mixer 42 and the centerbody 24 are illustrated in more detail. The lobed mixer 42 includes a plurality of circumferentially spaced and alternating radially inner lobes 58 and radially outer lobes 60. The inner lobes 58 extend from the aft end 26 of the core cowl 22 and are inclined axially rearwardly with respect to the direction of flow to a reduced diameter at a mixer discharge plane 62 indicated by line 4—4. The inner lobes 58 are generally U-shaped and cooperate with spaced, substantially parallel sidewalls 64 to form cold chutes or channels 66. These cold chutes 66 are disposed in flow communication with the fan nozzle 38.

The outer lobes 60 also extend from the aft end 26 of the core cowl 22 and are inclined rearwardly to a larger diameter relative to the reduced diameter of the inner lobes 58. The outer lobes 60 are also generally U-shaped and cooperate with the sidewalls 64 to similarly form hot chutes or channels 68. These hot chutes 68 are disposed in flow communication with the core nozzle 30.

Referring to FIG. 3, the radially outer surface 48 of the centerbody 24 also includes a forward portion 70 and an aft portion 72 between which the intermediate portion 46 is disposed. All these portions are coaxially disposed about the longitudinal axis 54 of the centerbody 24. The aft portion 72 is inclined radially inwardly in an aft direction from the intermediate portion 46. The forward portion 70 is inclined radially inwardly in a forward direction and is suitably attached to the core engine 16 for supporting the centerbody 24 thereto.

Illustrated more particularly in FIGS. 3, 4 and 5 is the centerbody 24 including the nominal surface 52, which surface 52 is used for describing the orientation of the grooves 50 and the ridges 56 of the centerbody 24. The grooves 50 have a generally arcuate, concave cross section and extend radially inwardly from the nominal surface 52. Each groove 50 is preferably aligned substantially axially parallel to and faces directly oppositely to a respective outer lobe 60 of the mixer 42.

The ridges 56 have a generally arcuate, convex cross section and extend radially outwardly from the nominal surface 52. Each ridge 56 is preferably aligned substantially axially parallel to and faces directly oppositely to a respective inner lobe 58.

Referring to FIGS. 3 and 5, a hot chute flow area 74 is defined at the mixer discharge plane 62 and represents a unit flow area through which the hot exhaust gases 20 flow upon leaving the core nozzle 30. The mixer discharge plane 62 is defined as that plane extending through the intermediate portion 46 of the centerbody 24, which plane 62 is substantially aligned with an aft end of the lobed mixer 42.

It is known to those skilled in the art that the hot chute flow area 74 of a typical mixed flow exhaust system is a predetermined, fixed value based on selected engine thermodynamic cycle parameters. The exhaust system geometric parameters, as above described, are subsequently selected to obtain a compromise combination of mixer effectiveness and mixer pressure loss while maintaining the hot chute flow area 74 at the predetermined value.

For a prior art centerbody, the hot chute flow area 74 is typically defined as that cross-sectional flow area bounded by an inner surface of the mixer 42 and the outer surface of the centerbody 24, as represented by the nominal surface 52, divided by the number of inner lobes 58 or outer lobes 60. Typically, there are an equal number of inner lobes 58 and outer lobes 60, preferably 18 of each, although other numbers of lobes can be used.

In accordance with the preferred embodiment of the present invention as above described, the centerbody 24 and the lobed mixer 42 have been predeterminedly restructured over those of the prior art to increase mixing effectiveness over the typical mixed flow exhaust system without substantially increasing pressure losses therein. However, although the centerbody 24 has been restructed, it is preferred that the hot chute flow area 74 remain at the same value as that of a prior art exhaust system.

Accordingly, when the improved centerbody 24 is provided, the hot chute flow area 74 can be defined alternatively as that flow area bounded by the inner surfaces of one-half of adjacent inner lobes 58, the outer lobe 60, the sidewalls 64 and the radially outer surfaces of the groove 50 and one-half of adjacent ridges 56 of the centerbody 24.

In this regard, and as shown more particularly in FIG. 5, each ridge 56 of the centerbody 24 has a cross-sectional ridge area 76 defined as that area bounded by the convex outer surface of the ridge 56 and the nominal surface 52. Similarly, each groove 50 has a cross-sectional groove area 78 defined as that area bounded by the concave outer surface of the groove 50 and the nominal surface 52. Preferably the ridge area 76 is selected to equal the groove area 78 so that the addition of flow area due to the grooves 50 is offset by the loss of flow area due to the ridges 56. In this way, the hot chute flow area 74 remains at the predetermined magnitude based on the above-described thermodynamic cycle parameters even when the ridges 56 and the grooves 50 are included in the centerbody 24.

Referring to FIGS. 3 and 4, the radius of the centerbody 24, with respect to the longitudinal axis 54, at the ridges 56, or ridge radius $R_1$, minus the radius of the centerbody 24 at the grooves 50, or groove radius $R_2$, equals a depth d which has a maximum value D at the mixer discharge plane 62. For reducing parasitic pressure losses attributable to the centerbody 24, the grooves 50 and the ridges 56 of the intermediate portion 46 are aerodynamically blended with the forward portion 70 and aft portion 72 of the centerbody 24.

More specifically, the depth d varies from the maximum value D at the mixer discharge plane 62 to a substantially zero value at the junctions of the intermediate portion 46 and both the aft portion 72 and forward portion 70 of the centerbody 24. The ridges 56 and the grooves 50 are thus aerodynamically blended in the forward direction at a forward blend region 80, and in the aft direction at an aft blend region 82 of the centerbody 24. As used herein, the term "blend region" refers to a region wherein each ridge and/or groove on the centerbody makes a geometrically smooth transition to the aft portion and/or forward portion of the centerbody. Thus, no jump discontinuities in the slope may occur in this region.

It is to be appreciated that the use of the improved centerbody 24 having the grooves 50 and the ridges 56, the predetermined hot chute flow area 74, and the aerodynamic blending of the grooves 50 and the ridges 56 in the outer surface 48 results in an improved exhaust system 12 which is effective for significantly increasing the mixing effectiveness thereof without substantially increasing parasitic pressure losses over those of the prior art. This results in improved specific fuel consumption in the engine 10.

In an alternative embodiment of the exhaust system 12, the hot chute flow area 74, as shown in FIG. 5, can remain fixed even though the ridge area 76 and the groove area 78 are not made equal. This can be accomplished, for example, by predeterminedly relocating the sidewalls 64 of the mixer 42 appropriately closer together or farther apart to compensate for any net hot chute flow area changes due to unequal ridges 56 and grooves 50.

While there has been described herein what is considered to be preferred embodiments of the invention, other modifications will occur to those skilled in the art from the teachings herein.

For example, the centerbody 24 can include either the grooves 50 or the ridges 56 alone, with the depth d in FIG. 3 indicating the radial extent of the grooves 50 or the ridges 56 from the nominal surface 52. Although the ridges 56 and grooves 50 have been described as arcuate in profile, they could have other profiles, such as V-shaped.

Furthermore, various types of mixers 42 can also be used for cooperating with the centerbody 24. In one embodiment, the mixer 42 can include sidewalls 64, such as shown in FIG. 3, having rearwardly facing cutbacks or scallops therein (not shown).

Having thus described the invention, what is claimed as novel and desired to be secured by Letters Patent of the United States is:

1. A turbofan engine including:
   a fan;
   a core engine disposed downstream from said fan and coaxially therewith about an engine longitudinal axis;
   a core cowl disposed circumferentially about said core engine;
   an exhaust centerbody extending from an aft end of said core engine and spaced radially inwardly from an inner surface of said core cowl to define a core nozzle for discharging gases from said core engine; and
   a nacelle disposed circumferentially about said fan and core engine and spaced radially outwardly from said core cowl to define an annular bypass duct for channeling fan air downstream from said fan, said nacelle cooperating with an aft end of said core cowl for defining an annular fan nozzle for discharging fan air from said bypass duct, said nacelle extending downstream from said aft end of said core cowl for defining an exhaust nozzle for discharging both said fan air from said fan nozzle and said gases from said core nozzle;
   wherein said exhaust centerbody comprises:
      an annular member having a radially outer surface including forward, intermediate, and aft portions coaxially disposed about a longitudinal axis of said member, said aft portion of said outer surface being inclined radially inwardly in an aft direction from said intermediate portion, said intermediate portion being corrugated, so as to form a plurality of circumferentially spaced grooves and ridges therein, each of said grooves and ridges extending substantially axially in said intermediate portion.

2. A turbofan engine according to claim 1, wherein each of said grooves and said ridges extends axially to said forward and aft portions of said outer surface, respectively, to blend regions wherein said radial extension of each of said grooves and said ridges is substantially zero in magnitude for aerodynamically blending said forward and aft portions of said grooves and said ridges in said outer surface.

3. A turbofan engine according to claim 1, wherein each of said ridges extends radially outwardly from a reference surface of said intermediate portion and defines a cross-sectional ridge area between an outer surface of said ridge and said reference surface, and each of said grooves extends radially inwardly from said reference surface and defines a cross-sectional groove area between an outer surface of said groove and said reference surface, said cross-sectional ridge area being equal to said cross-sectional groove area.

4. A turbofan engine including:
a fan;
a core engine disposed downstream from said fan and coaxially therewith about an engine longitudinal axis;
a core cowl disposed circumferentially about said core engine;
an exhaust centerbody extending from an aft end of said core engine and spaced radially inwardly from an inner surface of said core cowl to define a core nozzle for discharging gases from said core engine;
a nacelle disposed circumferentially about said fan and core engine and spaced radially outwardly from said core cowl to define an annular bypass duct for channeling fan air downstream from said fan, said nacelle cooperating with an aft end of said core cowl for defining an annular fan nozzle for discharging fan air from said bypass duct, said nacelle extending downstream from said aft end of said core cowl for defining an exhaust nozzle for discharging both said fan air from said fan nozzle and said gases from said core nozzle; and
a lobed mixed disposed at said aft end of said core cowl and including a plurality of circumferentially spaced and alternating inner lobes and outer lobes, said outer lobes being rearwardly inclined relative to said innner lobes, said outer lobes and said inner lobes defining hot chutes and cold chutes in flow communication with said core nozzle and said fan nozzle, respectively;
wherein said exhaust centerbody comprises:
an annular member having a radially outer surface including forward, intermediate, and aft portions coaxially disposed about said longitudinal axis of said engine, said forward and intermediate portions being spaced radially inwardly from said lobed mixer, said aft portion of said outer surface being inclined radially inwardly in an aft direction from said intermediate portion, and said intermediate portion being corrugated so as to form a plurality of circumferentially spaced grooves therein, each of said grooves extending radially inwardly from a reference surface of said intermediate portion and extending substantially axially in said intermediate portion.

5. A turbofan engine according to claim 4 wherein said intermediate portion of said outer surface of said annular member further includes a plurality of axially elongated ridges, each ridge disposed between adjacent grooves and extending radially outwardly from said reference surface of said intermediate portion, and wherein each of said grooves faces a respective one of said hot chutes of said lobed mixer and each of said ridges faces a respective one of said cold chutes of said lobed mixer.

6. A turbofan engine according to claim 5, wherein outer surfaces of said grooves and said ridges and inner surfaces of said hot chutes and said cold chutes define a hot chute flow area therebetween which is substantially equal to a hot chute flow area defined with respect to said reference surface of said intermediate portion of said annular member.

7. A turbofan engine according to claim 1 or 2, wherein said forward portion of said outer surface is inclined radially inwardly in a forward direction from said intermediate portion of said outer surface.

8. For a mixed flow turbofan engine including a core engine, a fan air bypass duct and a lobed mixer for mixing fan bypass air with core engine combustion gases, an exhaust centerbody, comprising:
an annular member including a radially outer surface disposed coaxially about a longitudinal axis of said member, said outer surface having an intermediate portion effective for being spaced radially inwardly from said lobed mixer;
said intermediate portion being corrugated so as to form a plurality of circumferentially spaced grooves therein, each of said grooves extending radially inwardly from a reference surface of said intermediate portion and extending substantially axially in said intermediate portion;
said intermediate portion further including a plurality of axially elongated ridges, each ridge disposed between adjacent grooves and extending radially outwardly from said surface surface of said intermediate portion; and
wherein each of said ridges defines a cross-sectional ridge area between an outer surface thereof and said reference surface and each of said grooves defines a cross-sectional groove area between an outer surface thereof and said reference surface, said cross-sectional ridge area being equal to said cross-sectional groove area.

* * * * *